J. J. SEEMANN.
HEATER CASING CONSTRUCTION.
APPLICATION FILED FEB. 24, 1919.
1,379,051.
Patented May 24, 1921.
2 SHEETS—SHEET 1.
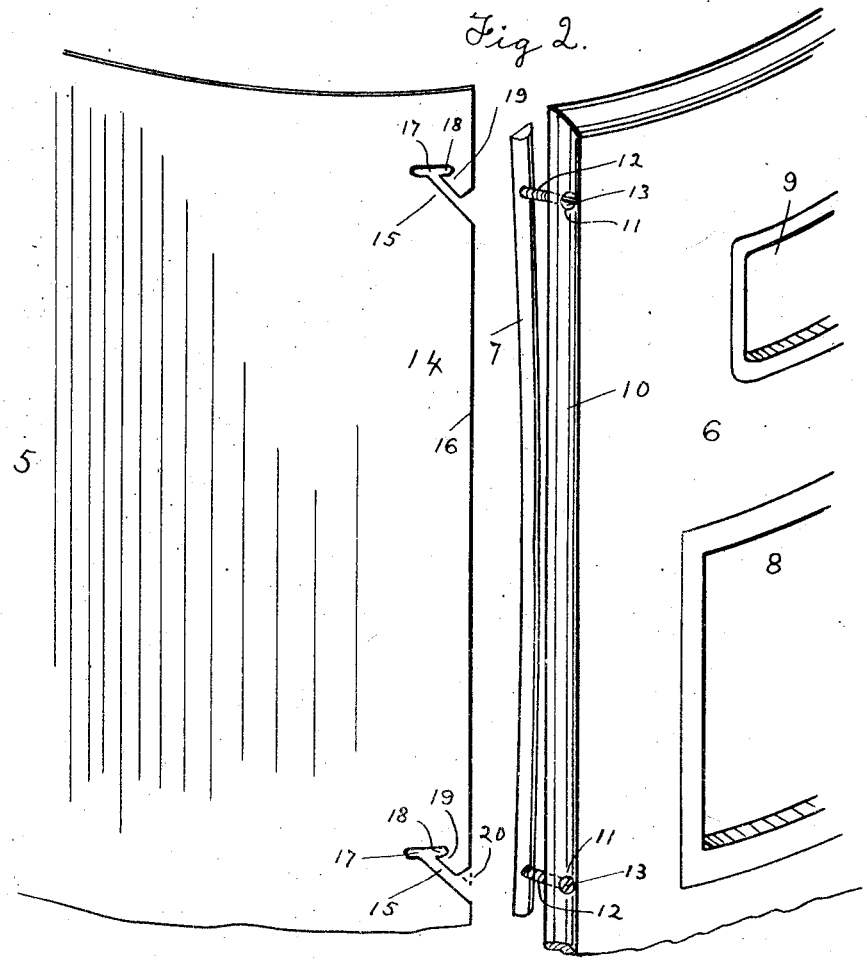
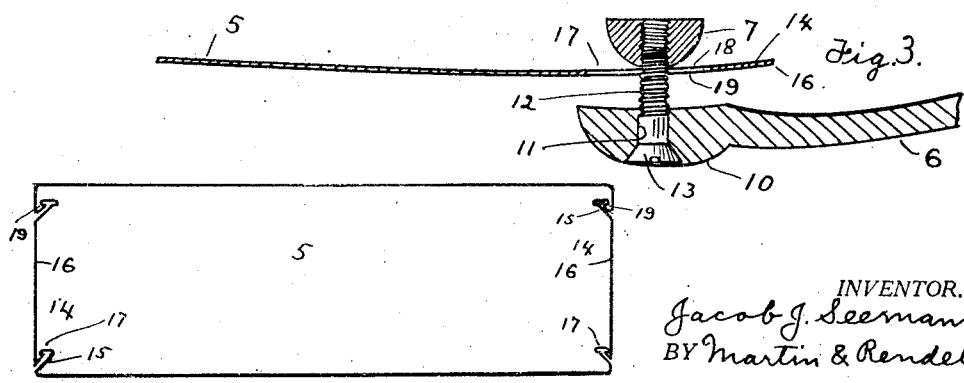
INVENTOR.
Jacob J. Seemann
BY Martin & Rendell
ATTORNEYS.

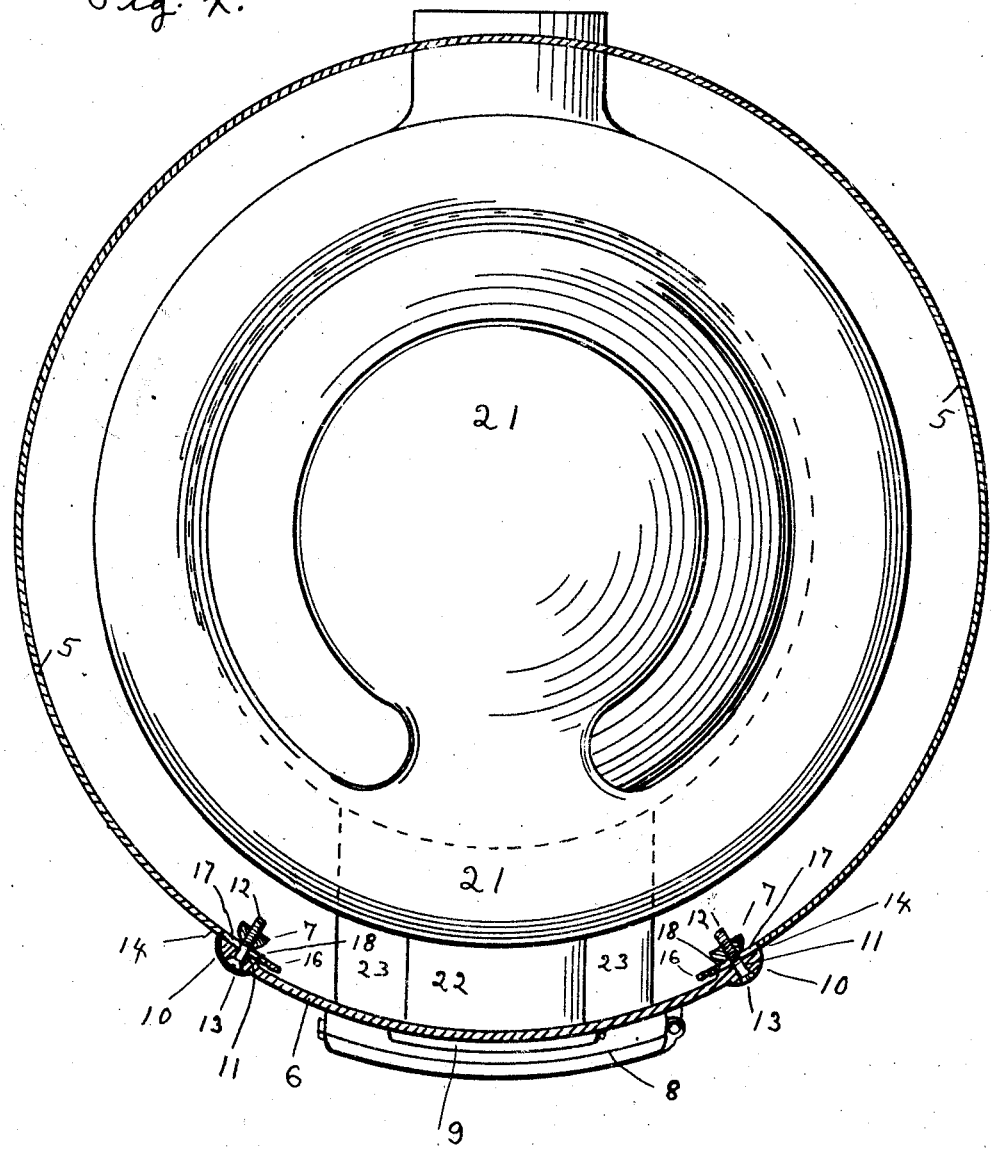

UNITED STATES PATENT OFFICE.

JACOB J. SEEMANN, OF UTICA, NEW YORK, ASSIGNOR TO UTICA HEATER COMPANY, OF UTICA, NEW YORK, A CORPORATION.

HEATER-CASING CONSTRUCTION.

1,379,051.     Specification of Letters Patent.     Patented May 24, 1921.

Application filed February 24, 1919. Serial No. 278,760.

*To all whom it may concern:*

Be it known that I, JACOB J. SEEMANN, a citizen of the United States, and a resident of the city of Utica, in the county of Oneida and State of New York, have invented certain new and useful Improvements in Heater-Casing Construction; and I do hereby declare that the following is a full, clear, and exact description thereof, which will enable others skilled in the art to which it appertains to make and use the same. reference being had to the accompanying drawings, and to the reference numerals marked thereon, which form part of this specification.

My present invention relates to a heater casing construction particularly adapted for use in warm air heaters having a panel front secured to the heater proper and a casing encircling the heater and secured to said panel front.

The purpose of my invention is to provide an improved form of heater casing construction which is simple and economical to make and assemble and which is of wide adaptability.

In warm air heaters having a panel front secured to the heater proper and having a thin sheet casing usually of metal to encircle the heater proper and be attached to the said panel front, it has been found very difficult to provide a satisfactory means for fastening the ends of said outer casing to the front. The construction heretofore used of having bolts go through holes in the front and holes in the edge of the casing with nuts on the inside of the casing is not satisfactory for the reason that the holes punched at the factory are hardly ever put in the right place and allow no adjustment. This construction is extremely difficult to assemble in that a person has to reach down so far inside the casing to hold the nuts in place to catch the bolts. These difficulties have been further increased where the heater has been provided with two sheet metal casings as in the so-called pipeless or one pipe type of heater. The purpose of my invention is to provide a construction free from the defects above mentioned and having important advantages in the convenience of assembling and adjusting the parts of the heater.

A further purpose is to provide a construction of the character described wherein one man even though not an expert may readily assemble the casing upon the heater without special tools; and further to provide a construction having means for a temporary holding either or both ends of the casing in place upon the front while the casing is being adjusted to its desired permanent position and also having means for then readily and permanently fastening the casing in the desired position.

Further purposes and advantages of my invention will appear from the specifications and claims herein.

Figure 1 is a plan or pattern view on a very small scale of the casing as formed in my construction.

Fig. 2 is a perspective view on a larger scale of one of the side edges of the panel front, its coöperating rod attached thereto and the end of the casing to be attached to said side of the panel front, the parts being shown in the position they occupy immediately before the end of the casing is interposed between the panel front and said coöperating rod.

Fig. 3 is a horizontal sectional view on a still further enlarged scale after the end of the casing has been inserted between the panel front and the rod but before the parts have been drawn together.

Fig. 4 is a horizontal sectional view of a heater casing embodying my invention applied to a heater of which a top or plan view is shown.

Referring to the drawings in a more particular description it will be seen that the parts used in our construction comprise the usual casing 5 ordinarily composed of sheet metal, a panel front 6 and a rod 7 adjustably attached to the rear of the side edge of said panel front.

The panel front 6 is of the type usually used with warm air heaters and is securely fastened to the heater proper (not shown) but spaced therefrom as by being fastened to the passageways which extend from the heater proper forward such as to the feed door opening 8 and clean out opening 9. At intervals along the side edges 10 of the panel front there are provided, preferably near the top and bottom of said edge, suitable apertures 11 to loosely receive the shank of short stove bolts 12, of which the heads 13 may be countersunk into the said panel front.

To the rear of each side edge 10 inside the panel front 6 is provided and placed a rod 7, preferably a metal rod semi-circular in cross section with its rounding side toward the panel front. Preferably also this rod 7 will be curved or bent forward intermediate its ends as plainly indicated in Fig. 2.

Opposite the bolts 12 the said rod will be provided with screw-threaded holes to receive the ends of said bolts whereby in obvious manner the said rod is connected to the edge of the panel front but may be held spaced therefrom and gradually be drawn theretoward by turning up the bolts 12.

The ends 14 of the casing 5 are provided with slots 15 corresponding in number with the bolts 12 and spaced apart a similar distance. These slots 15 extend inwardly from the extreme edge 16 of the end of the casing in an upwardly slanting direction and open into an enlargement 17 extending lengthwise of the casing or substantially at right angles to the end edge 16 of the casing. The enlargement 17 extends back toward the end edge of the casing beyond the inner end of the slanting slot 15 forming a pocket 18 and leaving a downwardly directed and inwardly extending hook 19 formed of the material of the casing. Preferably the outer end of the slanting slot 15 will be widened by cutting away the point of metal 20 left between the upper side of the slot 15 and the edge 16 of the casing.

Assuming the panel front 6 of the heater to be set up and permanently secured in the usual way to the heater proper and with the rods 7 in place to the rear of the side edges 10 of the panel front but spaced back therefrom as shown in Fig. 2, one end 14 of the casing will be fitted to its side edge of the panel front. This is done by placing the end of the casing between the edge of the panel front and the rod 7 with the shanks of the bolts 12 passing in obvious manner into the wide outer ends of the slots 15 and then into the slanting main portions of said slots causing the end of the casing to pass inwardly and downwardly relative to the panel front. This end of the casing may be fitted all the way down on both its slanting slots 15 until both the bolts come into the enlargements 17. In practice, however, the workman finds it better to fit this first end of the casing down to that position at the upper slot only so that the bolt there is engaged by the hook and to leave the lower part not positively locked. As thus placed together this end of the casing will be held sufficiently in place to enable the workman to bend the casing about the heater proper at the proper distance and insert the other end of the casing between the other side edge of the panel front and its cooperating rod 7. This second end of the casing will be set down on both its bolts to have both the bolts ride in the enlargements 17. As the bolts 12 at said second end of the casing will then be in line with the pockets 18 of that end of the casing said second end of the casing cannot slip back from its edge of the panel front or out of engagement with the said bolts 12. If as suggested the first end of the casing has been locked at only one slot the workman will then set the first end of the casing so that both the bolts will ride through the lengthwise enlargements 17 thus bringing the bolts opposite the pockets 18 and preventing disengagement of this end of the casing from its side of the panel front. Then the casing is adjusted circumferentially of the heater or back and forth from either end or from its middle toward both ends to make a close fitting and neat job. As the casing gets to be partly fitted the bolts 12 are screwed up so that the middle of the rod more tightly binds the adjacent part of the ends of the casing. In this way the casing is held in any position to which it may be adjusted but can be with a little force slipped past the rod if desired for further adjustment. When the casing has been set into desired position the bolts are screwed up springing the ends of the rod 7 outward against the inner surface of the casing throughout the entire length of the rods and engaging not only the body of the casing between the slots 15 and enlargements 17 but the portions of the casing above the upper enlargement and below the lower enlargement.

The purpose in prefering that the rod 7 be semi-circular in section with its rounding side toward the panel front is that there is thus less friction between the rod and the casing when the rod is only partly drawn forward during the adjusting process.

It will be obvious that many modifications may be made in my construction without departing from the spirit of my invention as shown herein and claimed in the claims given below.

What I claim as new and desire to secure by Letters Patent is:

1. In a heater casing construction the combination of a panel front having its side edges provided at intervals with bolt-receiving apertures, a rod at the rear of each side edge of said panel front, bolts extending loosely through said apertures in the panel front and in adjustable engagement with said rods and a casing having its opposite ends over-lapping the side edges of the panel front, said ends of the casing being provided with a plurality of slots extending in from the edge of said ends in a slanting direction and terminating with an enlargement substantially at right angles with said end edges, the ends of the casing being located between the side edges of the panel front and said rods with the bolts extending through said enlargements.

2. In a heater casing construction the combination of a panel front having its side edges provided at intervals with bolt-receiving apertures, a rod at the rear of each side edge of said panel front, bolts extending loosely through said apertures in the panel front and in screw-threaded engagement with said rods and a casing having its opposite ends over-lapping the side edges of the panel front, said ends of the casing being provided with a plurality of slots extending in from the edge of said ends in a slanting direction and terminating with an enlargement substantially at right angles with said end edges, the ends of the casing being located between the side edges of the panel front and said rods with the bolts extending through said enlargements, said enlargements extending toward the adjacent edges of the casing from the point of intersection of the slanting slots with said enlargements.

In witness whereof I have affixed my signature this 17th day of February 1919.

JACOB J SEEMANN.